March 31, 1970  V. M. SHIELDS  3,503,547
AUTOMOBILE ROOF-TOP CARRIER
Filed March 4, 1968  2 Sheets-Sheet 1
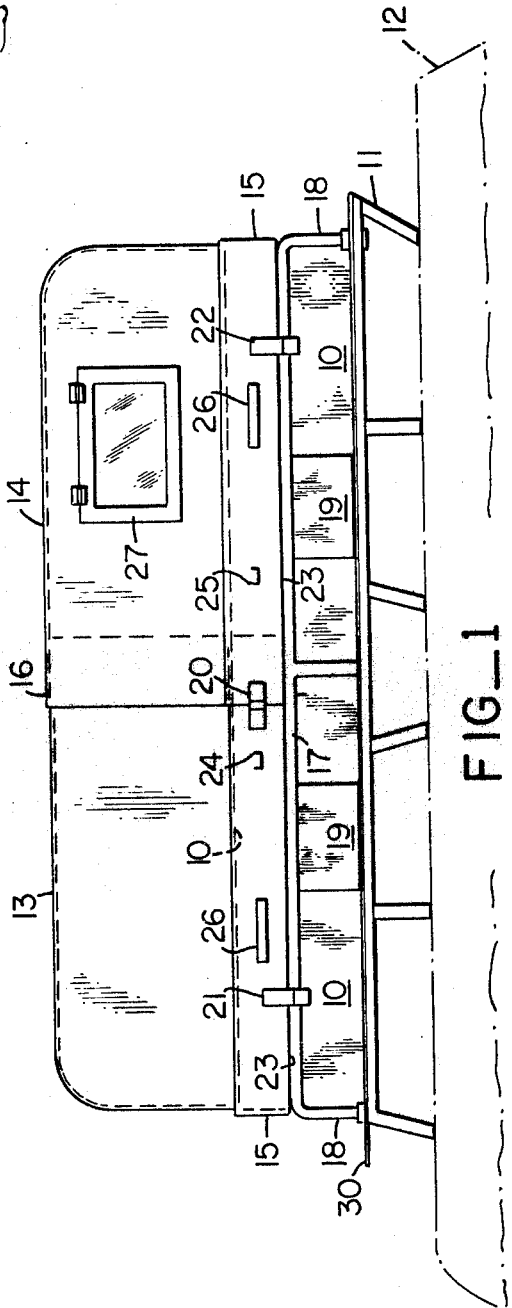
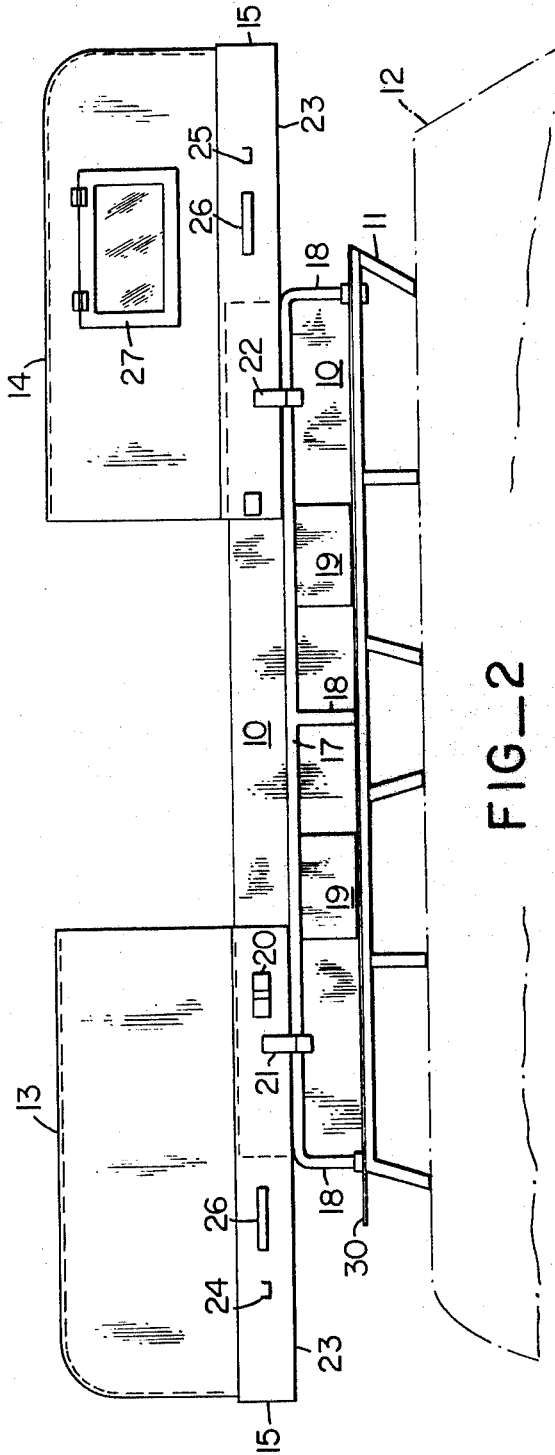
INVENTOR.
VALERIE M. SHIELDS
BY
Townsend and Townsend
ATTORNEYS

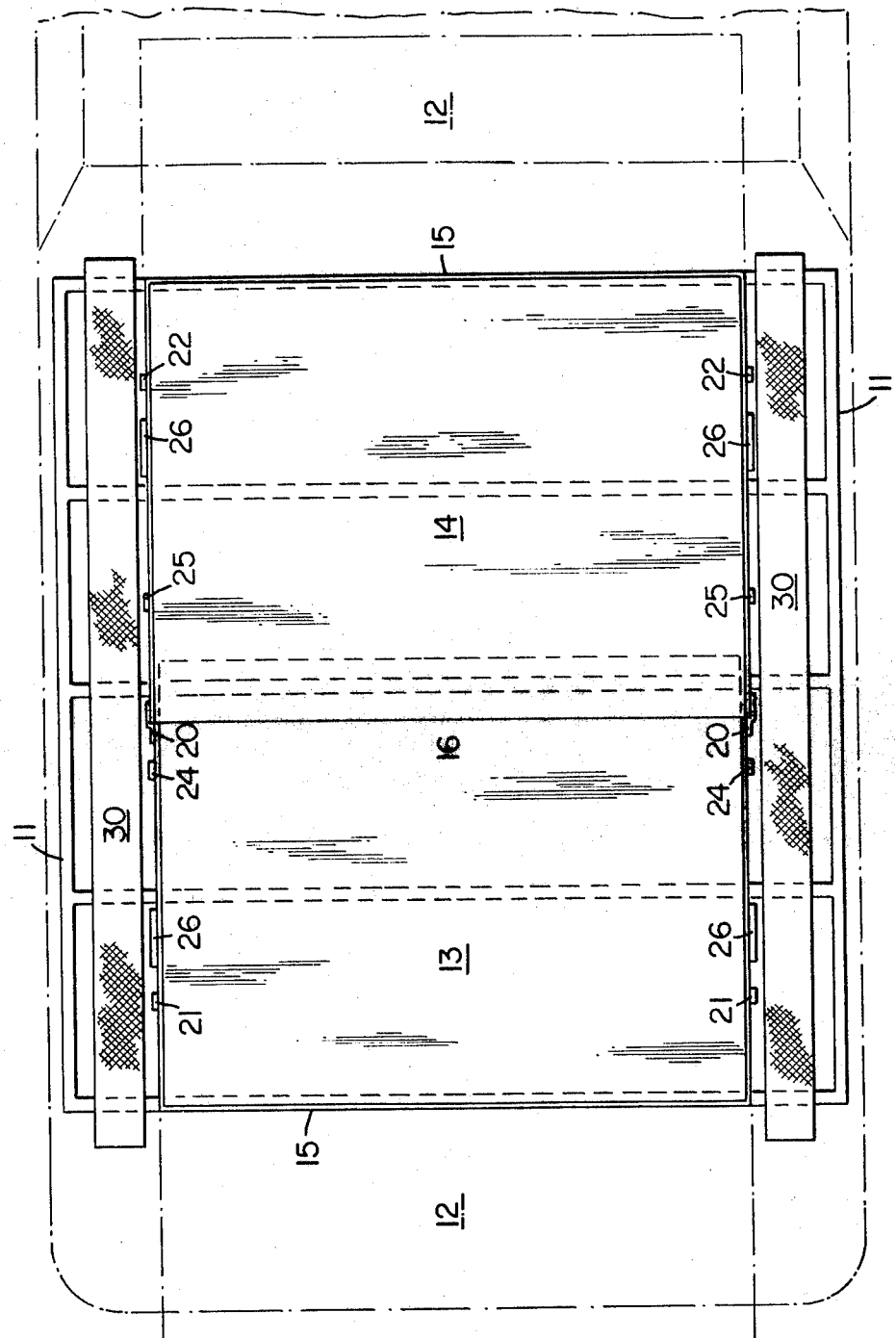

3,503,547
AUTOMOBILE ROOF-TOP CARRIER
Valerie M. Shields, 120 Santa Paula Ave.,
San Francisco, Calif. 94127
Filed Mar. 4, 1968, Ser. No. 710,062
Int. Cl. B60r 9/04
U.S. Cl. 224—42.1                    8 Claims

ABSTRACT OF THE DISCLOSURE

An automobile roof-top carrier is disclosed comprising a rectangular base compartment positioned on a rack on the roof of a vehicle over which is positioned the two halves of a weather-proof cover. A depending skirt on the cover overlaps the base compartment and a weatherproof sleeve on one half cover overlaps the other half cover. The half covers are adapted to slide along tracks provided on each side of the rectangular base compartment and suitable latches are provided to hold the half covers in position when they are either engaged or separated.

---

This invention relates to a new and improved automobile roof-top carrier useful as a luggage carrier or as a camper.

It is an object of the present invention to provide a new and improved automobile roof-top carrier capable of use as a luggage carrier or as a camper.

Another object of the invention is to provide an automobile roof-top carrier which includes secure weatherproof features and which may be securely locked and yet which also is easily accessible.

A further object of the invention is to provide a new and improved automobile roof-top carrier which may be mounted on an ordinary automobile roof-top rack and which may include walkways along either side of the carrier to facilitate access to the carrier.

Yet another object of the invention is to provide an automobile roof-top carrier having slidable cover portions separable for easy access to the carrier and engageable along a weather-proof sleeve.

In order to accomplish these results, the present invention contemplates providing a rectangular base compartment having side wall portions positioned on an automobile roof-top rack and over which is positioned the two halves of a weather-proof cover. The cover includes a depending weather-proof skirt which overlaps the base compartment and one of the half covers includes a weather-proof sleeve which overlaps the other half cover. The half covers are adapted to slide along tracks provided on each side of the rectangular base compartment and suitable latches are provided to hold the half covers in position when they are either engaged or separated. Walkways may be provided on the automobile rack on either side of the carrier to facilitate access to the carrier. If the carrier is to be used as a camper, one or more windows may be provided in the side walls of the cover portions.

Other objects, features and advantages of the present invention will become apparent in the following specification and accompanying drawings.

In the drawings:

FIG. 1 is a side elevation view of an automobile roof-top carrier embodying the present invention.

FIG. 2 is a side elevation view of the automobile roof-top carrier illustrated in FIG. 1 with the half covers in separated relationship.

FIG. 3 is a plan view of the automobile roof-top carrier.

In the embodiment of the present invention illustrated in FIG. 1 there is provided a rectangular base compartment 10 having side wall portions securely mounted on a conventional automobile rack 11 in turn mounted on the automobile roof-top 12. Positioned over the rectangular base compartment are half covers 13 and 14 each provided with a depending skirt 15 which overlaps the side wall portions of the rectangular base compartment 10. The depending skirt 15 may be provided with weatherproof stripping for engaging the side wall portions of the rectangular base compartment 10. The half cover 14 is provided with an extending weather-proof sleeve 16 which overlaps the half cover 13 when the half covers are engaged over the rectangular base compartment.

The lower edge of the depending skirt 15 on each half cover 13 and 14 rests upon a track 17 provided on either side of the rectangular base compartment 10. The track 17 may be connected to rectangular base compartment 10 by braces 18 which are also secured to the automobile rack 11 so that the track 17 and braces 18 may also serve as mounting means for the rectangular base compartment 10 on the automobile rack 11.

Spacing blocks 19 may be provided along the side portions of the base compartment for positioning the tracks 17 along opposite sides of the base compartment.

When the half covers 13 and 14 are in an engaged relationship over the rectangular base compartment, latches 20 on either side of the cover retain the half covers together. Latches 21 and 22 on either side of the half covers retain the half covers securely in position on the rectangular base compartment 10. With the latches 20, 21 and 22 released, one or both of the half covers 13 and 14 may be slid along the track 17 to provide access to the base compartment. In the illustrated embodiment of the invention, the bottom edge of the half covers are each provided with an extension 23 from the skirt 15 which guides the covers as each slides along the track 17. Rollers or other bearing means may be provided on the track 17 or the bottom edge of the covers 13 and 14 to provide translation along the track 17.

With one or both of the half covers translated to an outwardly extending position, the latches 21 and 22 fixed to the rectangular base compartment may engage the latch locks 24 and 25, respectively, to maintain the half covers in fixed position on the tracks 17 when they are in a separated relationship as illustrated in FIG. 2. Handles 26 may be provided to facilitate translating the half covers along the tracks 17.

In addition to being translatable along the tracks 17, the half covers 13 and 14 are also adopted to be lifted entirely off the rectangular base compartment 10 using the handles 26.

Because compressible linings may be utilized at each of the joints of the carrier, and the joints maintained under pressure by latches 20, 21 and 22, the carrier has the advantage of being silent during use.

When the automobile roof-top carrier is intended for use as a camper, one or more windows 27 may be provided in the walls of the half cover portions 13 and 14.

It is apparent that the present invention lends itself to construction according to many possible dimensional specifications. Thus, depending upon its intended use as a luggage carrier or a camper, the height, length and width of the rectangular base compartment and cover portions may vary. Furthermore, the shape of the covers may also vary to provide a desired aerodynamic shape. The carrier may be constructed from wood, metals such as aluminum, synthetic materials, or combinations thereof. Furthermore, weatherproof stripping may be provided between the overlapping engaging portions of the carrier.

The automobile roof-top carrier described herein may be positioned on a conventional automobile rack to provide the desired elevation of the carrier from the roof-top. Thus, the carrier may be spaced from the roof-top as illustrated in FIG. 1 to permit storage of items in the space beneath the carrier and the roof-top. Alternatively, the carrier may be positioned immediately adjacent the roof-top on suitable ribs to prevent damage to the roof-top finish. As illustrated in FIG. 3, with the carrier positioned on a conventional automobile rack, walkways 30 may be provided on either side of the carrier to facilitate access to the inside of the carrier.

Locks may be provided in conjunction with the latches 20, 21 and 22 to secure the carrier from tampering. The carrier by means of tracks 17 and braces 18 may be permanently secured to the automobile rack 11 which may in turn be locked to the automobile.

The automobile roof-top carrier disclosed herein is adapted for use not only on automobiles, but also on trucks and other vehicles.

What is claimed is:

1. A vehicle roof-top carrier comprising: a base compartment having a bottom and side wall portions, said base compartment positioned above the roof of the vehicle; first and second cover means adapted to overlap the side wall portions and enclose said base compartment and frictionally engage the side wall portions of said base compartment, one of said first and second cover means being adapted to overlap the other of said cover means when the first and second cover means are positioned over the base compartment; track means positioned adjacent opposite sides of said rectangular base compartment adapted to engage the lower edge of said first and second cover means and guide said first and second cover means in slidable relationship thereon.

2. A vehicle roof-top carrier as set forth in claim 1 wherein there is provided complementary latch means on said cover means and base compartment, respectively, whereby said first and second half covers may be secured along said track means at a plurality of positions.

3. A vehicle roof-top carrier as set forth in claim 1 wherein there is provided complementary latch means on the first and second cover means, respectively.

4. A vehicle roof-top carrier as set forth in claim 1 wherein said carrier is mounted on an automobile roof-top rack means.

5. A vehicle roof-top carrier as set forth in claim 4 wherein there is provided a walkway along the automobile roof-top rack along at least one side of the automobile roof-top carrier.

6. A vehicle roof-top carrier as set forth in claim 1 wherein there is provided roller means simultaneously engaging said track means and the bottom edge of the cover means for sliding the cover means along the track means.

7. A vehicle roof-top carrier as set forth in claim 1 wherein there is provided at least one window in one of said cover means.

8. An automobile roof-top carrier comprising: a base compartment having a bottom and side wall portions said base compartment positioned above the roof of the vehicle; track means mounted adjacent opposite sides of said base compartment; first and second half cover means adapted to be positioned over the base compartment and overlap the side wall portions and enclose the base compartment, said cover means also being adapted to rest upon the track means, one of said half cover means having an extending sleeve portion adapted to overlap the other half cover portion, said first and second half cover means being adapted to slide along said track means to a plurality of positions relative to the base compartment, and means for securing said half cover means at a plurality of positions along the track means.

References Cited

UNITED STATES PATENTS 3,165,762  1/1965  Hage _____ 296—137 XR
3,359,693  12/1967  Mitas.

GERALD M. FORLENZA, Primary Examiner

F. E. WERNER, Assistant Examiner

U.S. Cl. X.R.

296—137